(12) United States Patent
Vegliante et al.

(10) Patent No.: US 11,531,136 B2
(45) Date of Patent: Dec. 20, 2022

(54) SYSTEM AND METHOD FOR AUTOMATICALLY DETECTING UNAUTHORIZED ENTRY INTO A POOL

(71) Applicant: Cutting Edge Packaging Solutions, Franklin Lakes, NJ (US)

(72) Inventors: Paul Vegliante, Franklin Lakes, NJ (US); William G. Rusin, III, Boston, MA (US)

(73) Assignee: Cutting Edge Packaging Solutions, Franklin Lakes, NJ (US)

( * ) Notice: Subject to any disclaimer, the term of this patent is extended or adjusted under 35 U.S.C. 154(b) by 7 days.

(21) Appl. No.: 17/217,138

(22) Filed: Mar. 30, 2021

(65) Prior Publication Data

US 2021/0231831 A1 Jul. 29, 2021

Related U.S. Application Data

(63) Continuation-in-part of application No. 17/003,204, filed on Aug. 26, 2020, now Pat. No. 11,348,435, (Continued)

(51) Int. Cl.
*G01V 8/20* (2006.01)
*G01V 8/22* (2006.01)
*G08B 21/18* (2006.01)

(52) U.S. Cl.
CPC ............. *G01V 8/20* (2013.01); *G01V 8/22* (2013.01); *G08B 21/182* (2013.01)

(58) Field of Classification Search
CPC . G01V 8/20; G01V 8/22; G01V 1/001; G08B 21/182; G08B 13/183; G08B 21/08; G08B 21/082; G08B 25/016
See application file for complete search history.

(56) References Cited

U.S. PATENT DOCUMENTS 3,688,298 A * 8/1972 Miller ................ G08B 13/184
250/552
4,910,498 A * 3/1990 Feher ................ G08B 21/086
250/221
(Continued)

FOREIGN PATENT DOCUMENTS

AU 2010100193 A4 4/2010
FR 2789787 A1 8/2000
(Continued)

*Primary Examiner* — Sisay Yacob
(74) *Attorney, Agent, or Firm* — Hoffmann & Baron, LLP

(57) ABSTRACT

A system and method for automatically detecting unauthorized entry into a pool requiring no user involvement, and having a high degree of accuracy. The system comprises a plurality of light beam emitter devices and a plurality of light beam receiver devices positioned about the pool and a processor in communication with the plurality of light beam emitter devices and the plurality of light beam receiver devices. The plurality of light beam emitter devices emit a plurality of light beams and the plurality of light beam receiver devices receive a plurality of emitted light beams to form a grid extending across a the pool. Additionally, the processor monitors the grid, detects unauthorized entry into the pool based on an interruption of the grid, and generates and transmits an alarm message based on whether a level of the interruption of the grid exceeds a predetermined threshold.

8 Claims, 16 Drawing Sheets

Related U.S. Application Data which is a continuation of application No. 16/561,586, filed on Sep. 2, 2019, now Pat. No. 10,810,857.

(60) Provisional application No. 63/010,266, filed on Apr. 15, 2020.

(56) References Cited

U.S. PATENT DOCUMENTS

| | | | |
|---|---|---|---|
| 5,832,547 A | 11/1998 | Burroughs | |
| 5,974,898 A | 2/1999 | Peralta et al. | |
| 6,130,615 A | 10/2000 | Poteet | |
| 6,259,365 B1 * | 7/2001 | Hagar | G08B 21/086 340/556 |
| 7,218,235 B1 * | 5/2007 | Rainey | G08B 21/086 4/488 |
| 7,578,596 B2 * | 8/2009 | Martin | E04H 4/148 362/267 |
| 2011/0273291 A1 * | 11/2011 | Adams | G08B 13/183 340/552 |

FOREIGN PATENT DOCUMENTS

| | | |
|---|---|---|
| FR | 2884017 A1 | 10/2006 |
| NO | 2014/194921 A1 | 12/2014 |
| NO | 2018/170529 A1 | 9/2018 |

* cited by examiner

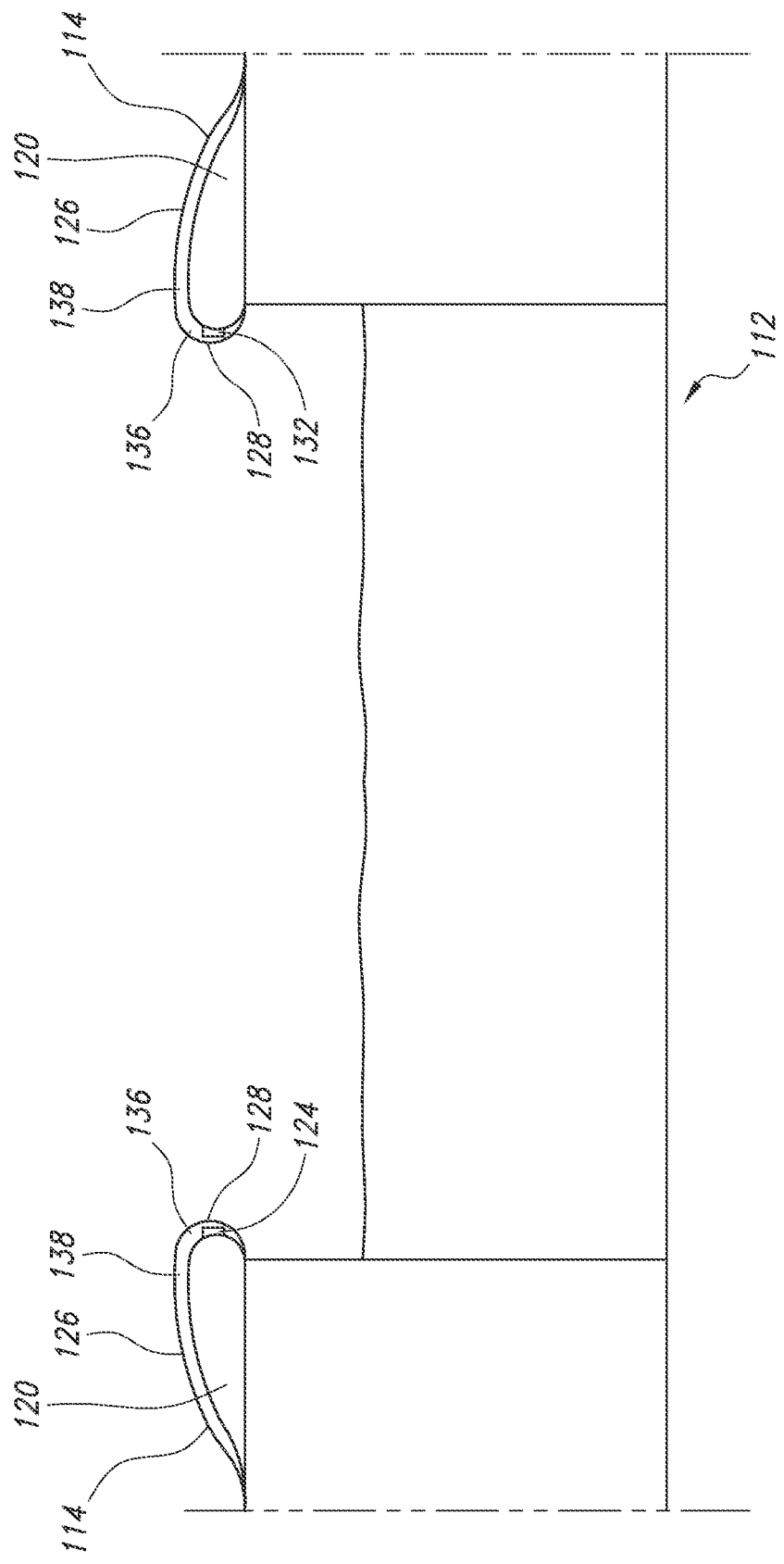

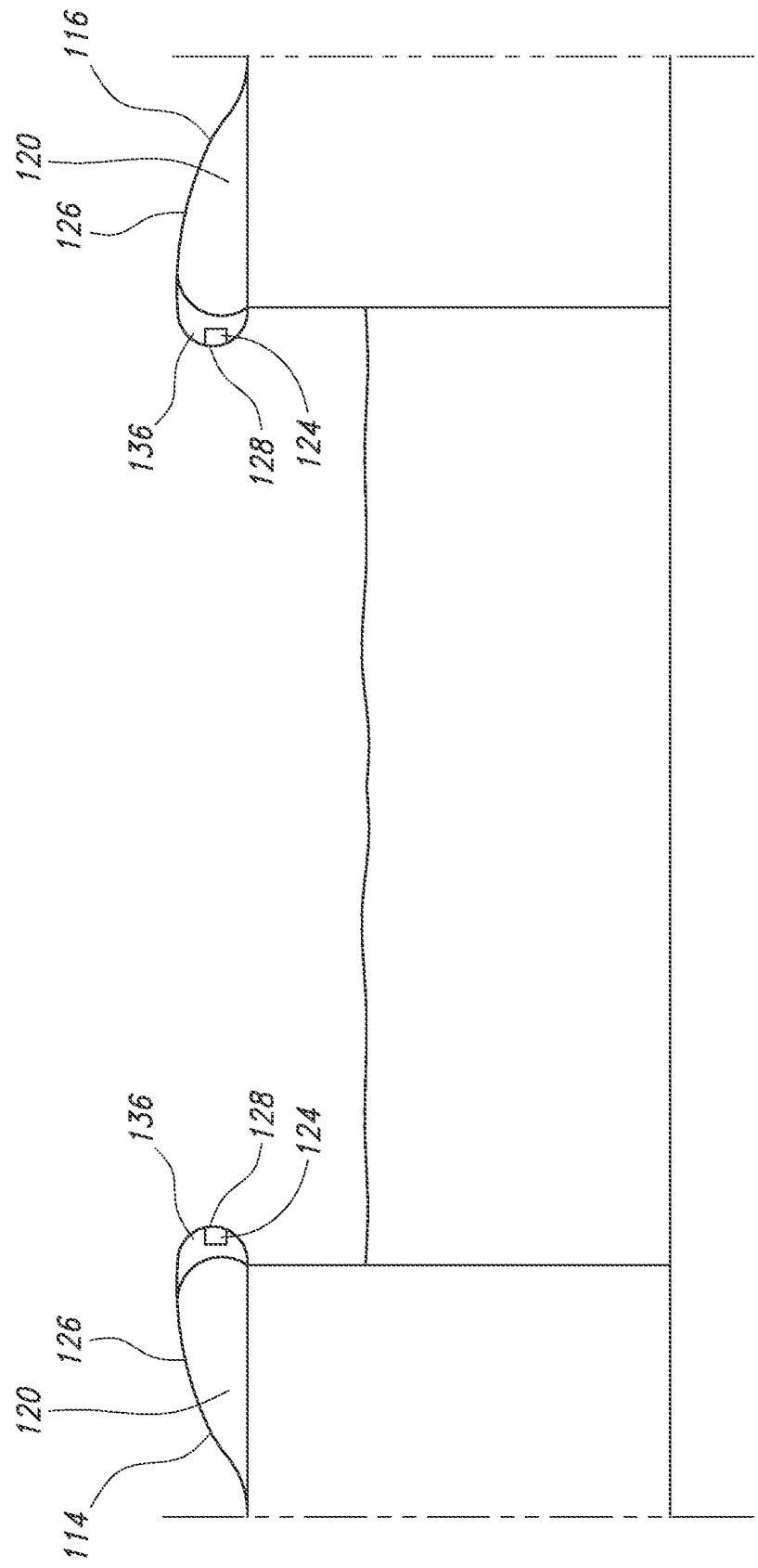

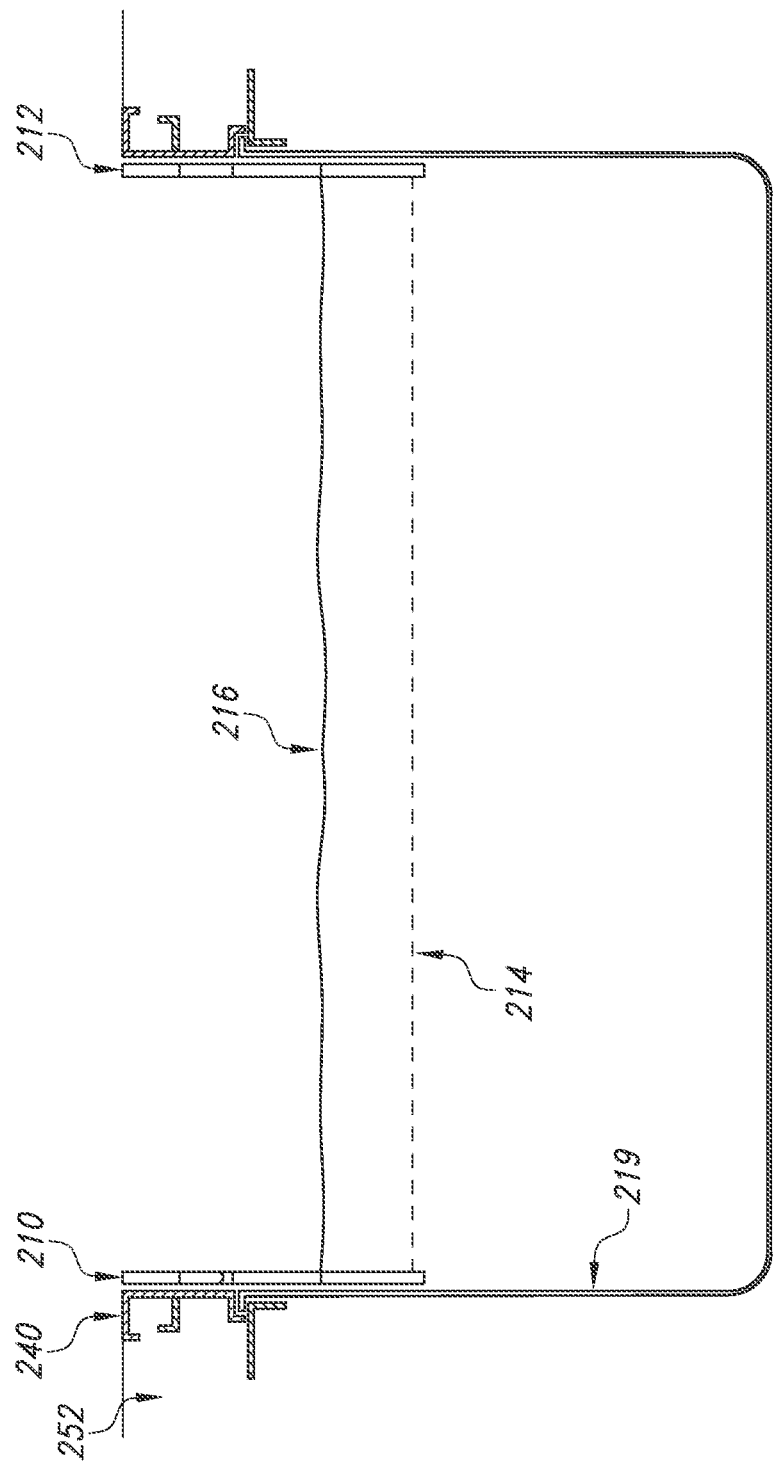

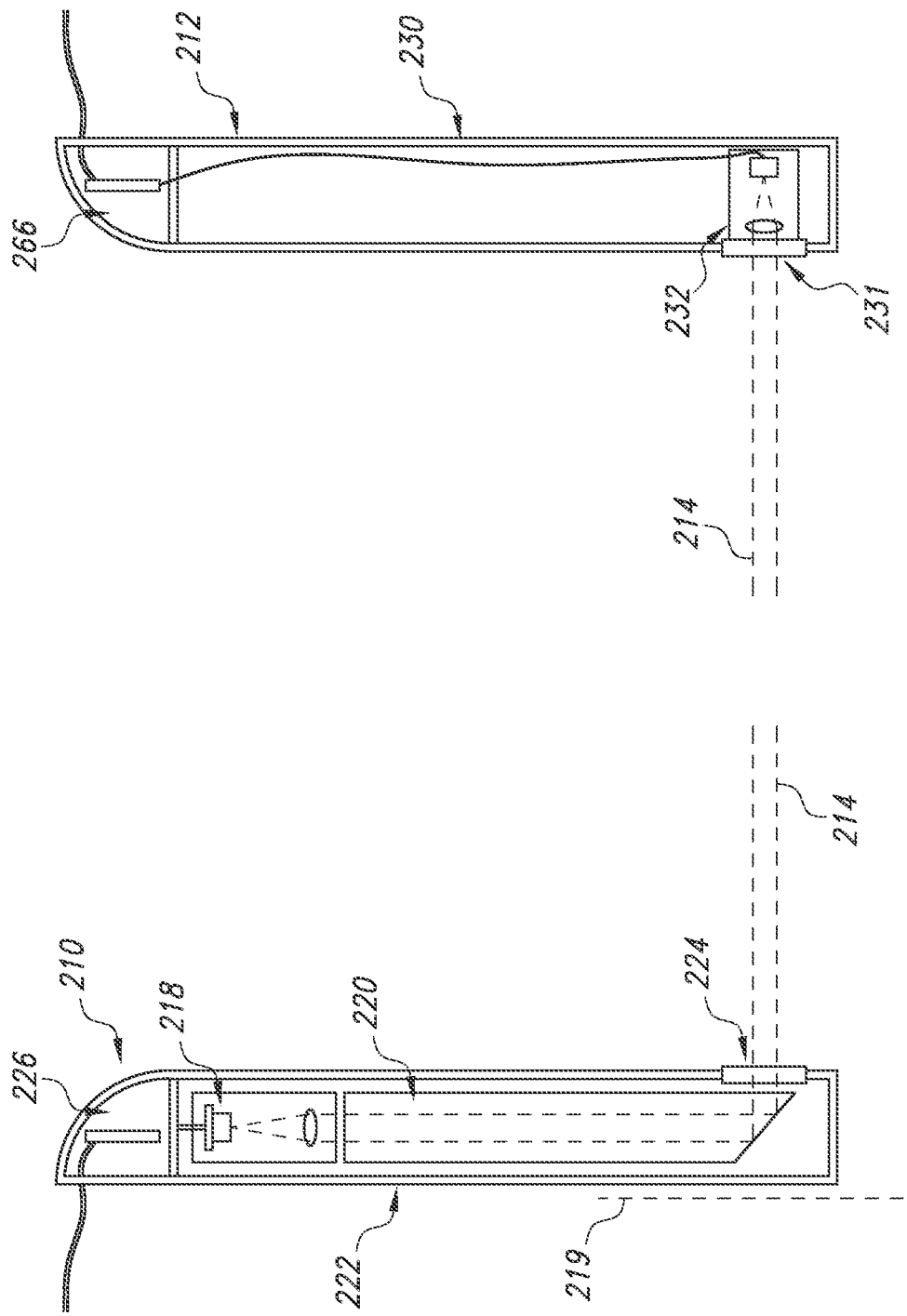

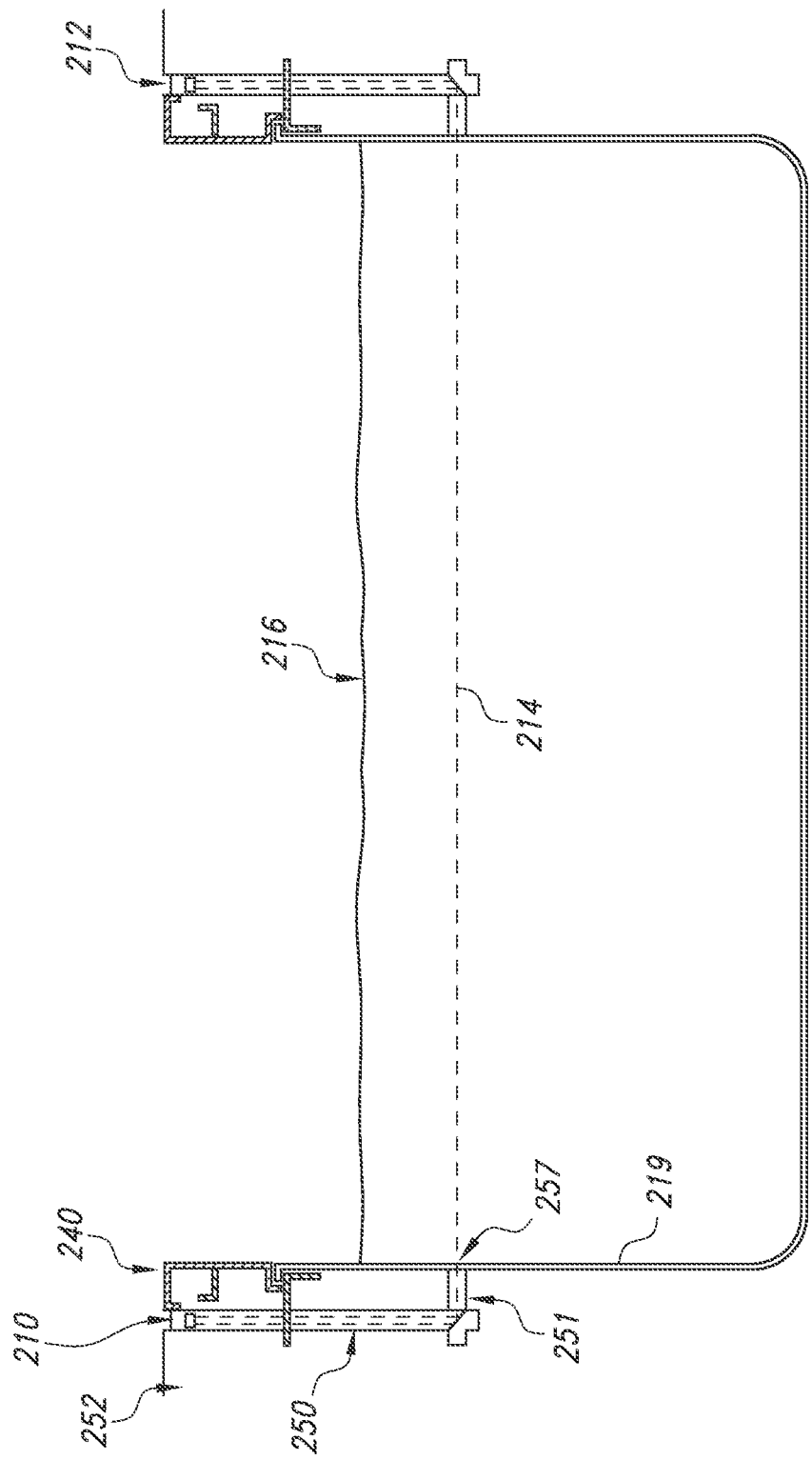

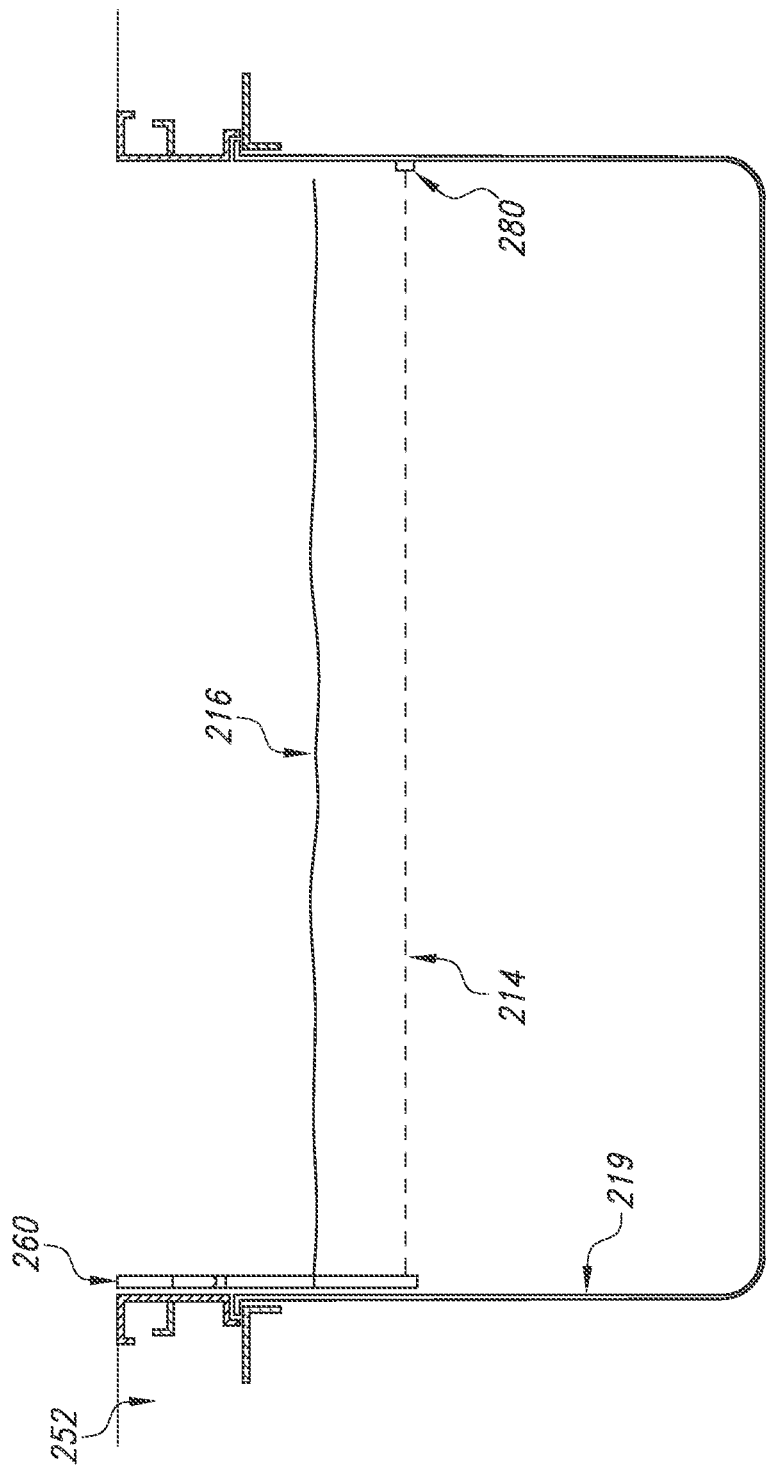

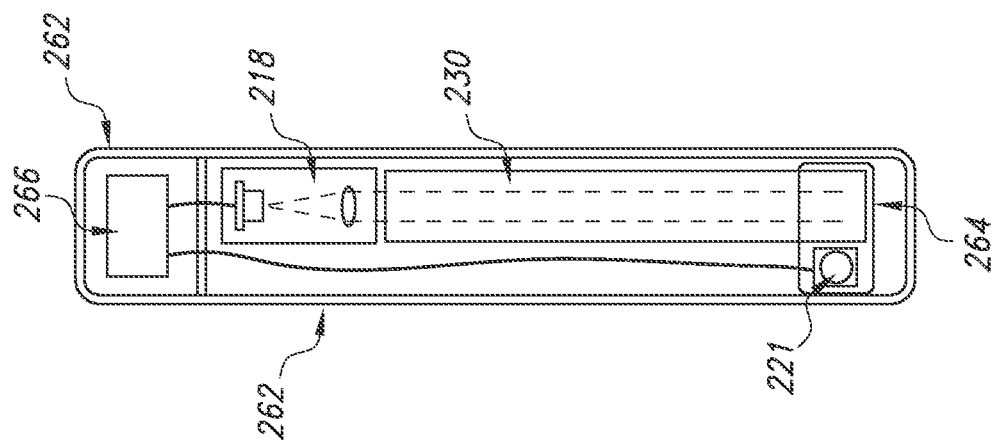
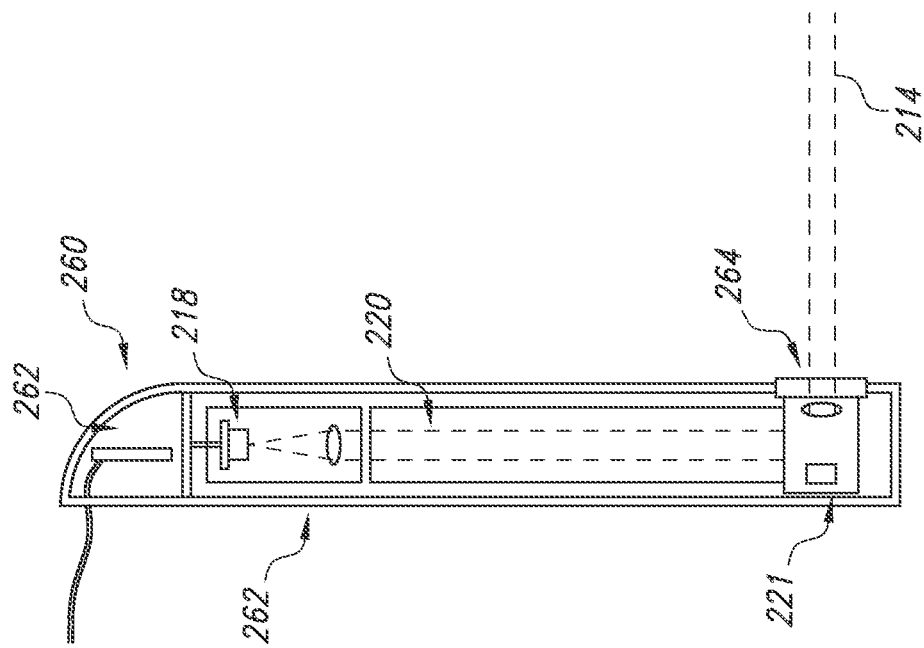
FIG. 16

SYSTEM AND METHOD FOR AUTOMATICALLY DETECTING UNAUTHORIZED ENTRY INTO A POOL

CROSS-REFERENCE TO RELATED APPLICATIONS

This application is a continuation-in part of U.S. application Ser. No. 17/003,204, filed Aug. 26, 2020, which is a continuation of U.S. application Ser. No. 16/561,586 filed on Sep. 5, 2019, now U.S. Pat. No. 10,810,857, issued Oct. 20, 2020, and claims priority to U.S. Provisional Application No. 63/010,226, filed Apr. 15, 2020, the contents of all of which are incorporated herein by reference in its entirety.

FIELD OF THE INVENTION

The present disclosure relates generally to the field of pool safety systems. More specifically, the present disclosure relates to a system and method for automatically detecting unauthorized entry into a pool.

BACKGROUND OF THE INVENTION

Conventional pool safety systems can be unreliable because of a dependency on user monitoring and the frequent false detection of motion in a pool. Additionally, conventional systems generally use a beam break detection and usually use a single band. As such, there is currently an interest in the field of pool safety in developing a motion detecting pool safety system that automatically detects unauthorized entry into a pool requiring no user involvement, and having a high degree of accuracy.

SUMMARY OF THE INVENTION

The present disclosure relates to a system and method for automatically detecting unauthorized entry into a pool requiring no user involvement, and having a high degree of accuracy. The system can, upon determining the detected unauthorized entry into the pool, automatically generate and transmit an alarm message to a remote device of a user and/or to a house alarm system.

The system comprises a plurality of light beam emitters, such as infrared light beam emitters, and a plurality of corresponding receivers, positioned along a perimeter of a pool, and a processor in communication with the plurality of emitter and receiver devices. The plurality of emitters and receivers form a grid extending over, on or below the water surface in a pool. The processor monitors the grid, detects unauthorized entry into the pool based on an interruption of one or more of the light beams forming the grid, and determines whether a level of the interruption of the grid exceeds a predetermined threshold. Thresholds can be set or adjusted by a user. The processor generates and transmits an alarm message to a remote device and/or a home alarm system when the level of the interruption of the grid exceeds the predetermined threshold.

BRIEF DESCRIPTION OF THE DRAWINGS

The features of the present disclosure will be apparent from the following Detailed Description, taken in connection with the accompanying drawings, in which:

FIG. 8 is a cross-sectional view taken along line A-A of FIG. 1;

FIG. 9 is a cross-sectional view taken along line A-A of FIG. 1 in an alternate embodiment.

FIGS. 11, 12 and 13 show an embodiment of the present invention where the components are placed under the water including an emitter and receiver module.

FIG. 14 shows another embodiment of the present invention where the components are placed in the surrounding concrete fill.

FIGS. 15-16 show an embodiment of the present invention using reflective material.

DETAILED DESCRIPTION OF THE PREFERRED EMBODIMENT

A system and method is disclosed for automatically detecting unauthorized entry into a pool requiring no user involvement, and having a high degree of accuracy, as described in detail below in connection with FIGS. 1-4.

Figure 1:
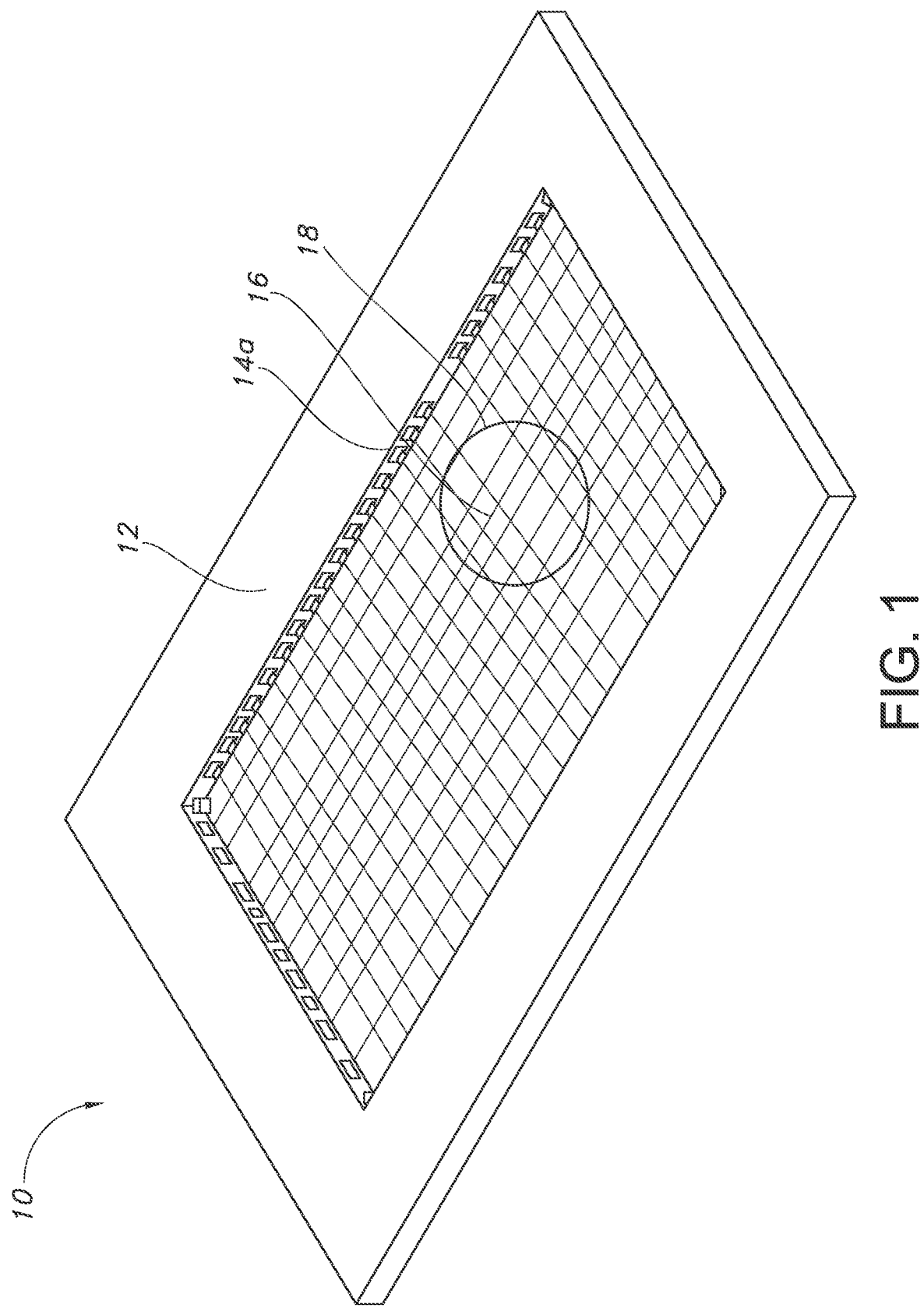
FIG. 1 is a diagram illustrating the system for automatically detecting unauthorized entry into a pool.

Turning to the drawings, FIG. 1 is a diagram illustrating the system 10. The system 10 comprises a plurality of emitters 14*a* and a corresponding plurality of receiving devices 14*b*. Each of the emitters 14*a* emits a light beam 16 such as an infrared light beam, and each of the corresponding receivers 14*b* receives a corresponding light beam 16 to form a grid 18 of light beam 16 extending across a pool 12. The emitter and receiver devices 14*a*, 14*b* could be positioned above or below a surface of the water (i.e., a waterline of the pool) along an interior perimeter of the pool 12. For example, the emitter and receiver devices 14*a*, 14*b* could be built into or attached to, a pool wall, pool coping or pool deck above or below the pool waterline. Any suitable light beam can be used, or any other type of point to point connection that can be interrupted by an object passing between the points, e.g. a laser, can be used for the detection system of the present disclosure.

The system 10 automatically detects unauthorized entry into the pool 12 when the system 10 detects an interruption of the grid 18 (e.g., an interruption of two or more adjacent light beams 16 forming the grid 18). If the system 10 determines that the number of interrupted light beams 16 exceeds a predetermined threshold, then the system 10 generates and transmits an alarm message to a remote device of a user (e.g., a pool owner) and/or a home alarm system. The remote device can include, but is not limited to, a personal computer, a laptop computer, a tablet computer and a smart telephone. The alarm message can notify the user of a potential drowning incident in the pool 12. Accordingly, the system 10 can automatically detect unauthorized entry into the pool 12 requiring no user involvement, and having a high degree of accuracy.

Thresholds level can be set and/or adjusted by the user. Threshold levels can cones to the number of light beams interrupted. The interruption of one light beam would provide for a very sensitive system, but could result in unwanted false alarms. For example, a sensitive system could suffer from false alarms from high winds, splashing water, small animals, insects, twigs or other debris, moths, birds, etc. A threshold requiring interruption of two or beams would significantly drop the chance of false alarms. Increasing the threshold too high could interfere with the functionality of sensor. Of course, the sensitivity depends on the spacing between adjacent light beams.

Figure 2:
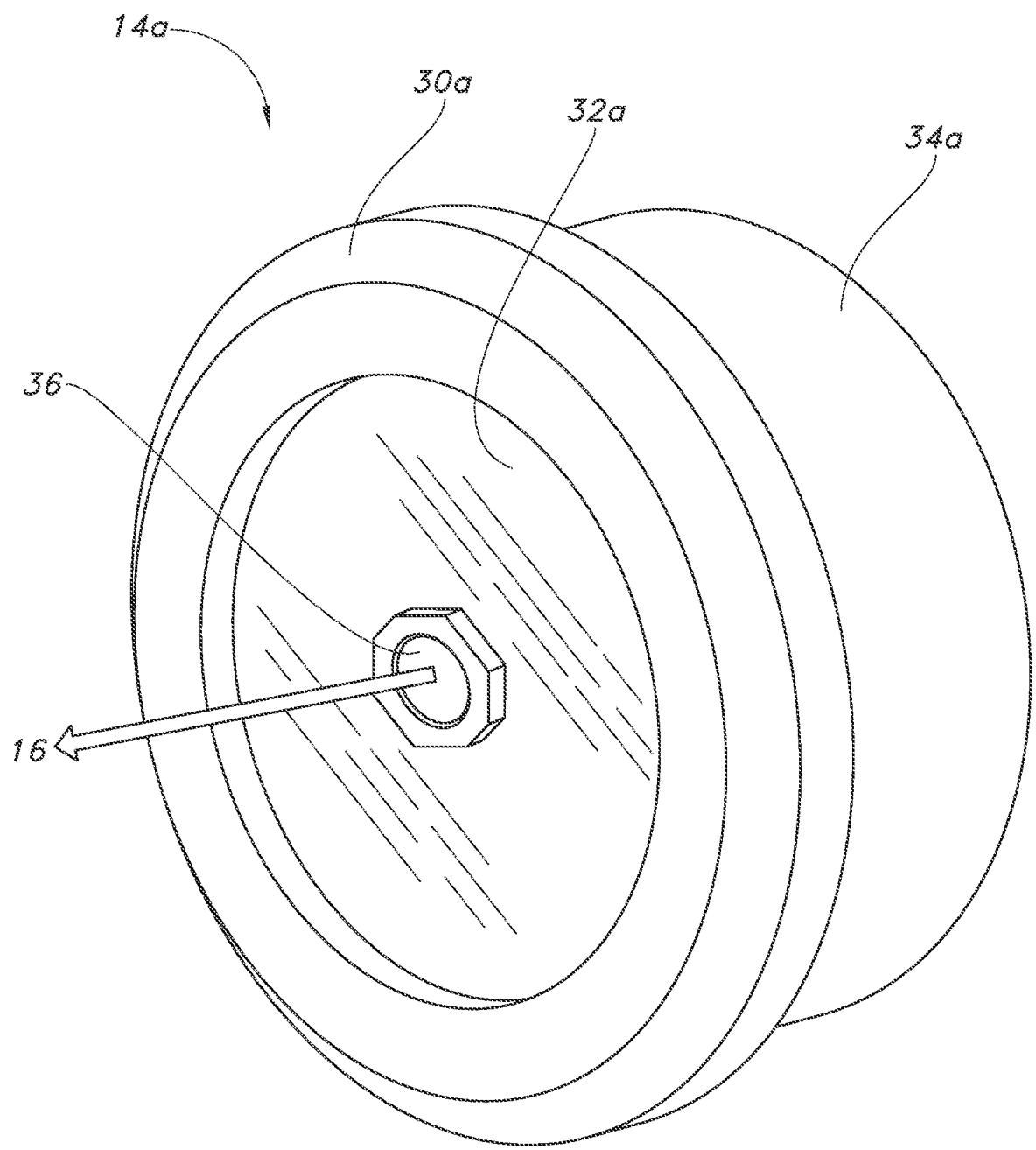
FIGS. 2 and 2A are diagrams illustrating components of the system of FIG. 1.
Figure 2A:
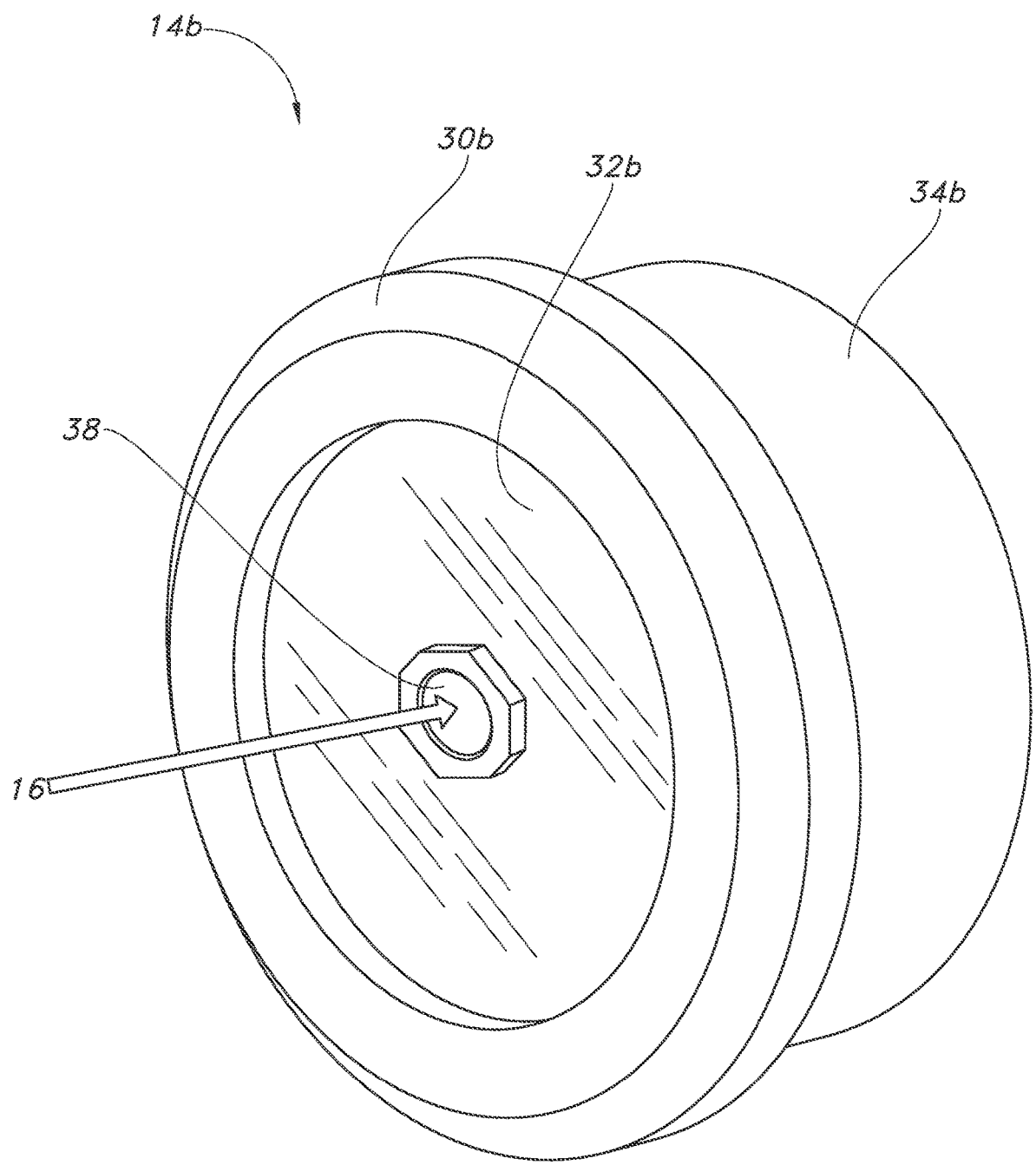

FIG. 2 is a diagram illustrating the emitter device 14a of the system 10 and FIG. 2A is a diagram illustrating the receiver device 14b of the system 10. The emitter and receiver devices 14a, 14b respectfully comprise a front housing 30a, 30b, a cover 32a, 32b, and a rear housing 34a, 34b. Additionally, the emitter device 14a comprises a light beam emitting portion 36 and the receiver device 14b comprises a light beam receiving portion 38.

The emitter and receiver devices 14a, 14b could include a cable attachment cord for supplying power to the emitter and receiver devices 14a, 14b. It should be noted that the emitter and receiver devices 14a, 14b could be any shape including, but not limited to, a rectangle, a square, a circle, a diamond, etc.

The rear housing 34a, 34b could be constructed of a thermally conductive and electrically insulative polymer material. Such a material could include, but is not limited to, electrically insulative and thermally conductive materials (e.g., plastic). In addition, the rear housing 34a, 34b could also be constructed of a chemical resistant material including, but not limited to, urethane, thermoplastic elastomer (TPE) overmolding, silicone or polyamide.

The front housing 30a, 30b could couple to the rear housing 34a, 34b via a plurality of mounting apertures and a plurality of screws (not shown) to form a watertight chamber between the front housing 30a, 30b and the rear housing 34a, 34b. It should be noted that the front housing 30a, 30b could be coupled to the rear housing 34a, 34b via any suitable means including, but not limited to, a plurality of tabs, an adhesive, tape, magnets, sonic welding, etc. Still further, if the emitter and receiver devices 14a, 14b are a circular shape, then the front housing 30a, 30b could be coupled to the rear housing 34a, 34b by way of a watertight threaded connection, i.e., the front housing 30a, 30b could be threaded onto the rear housing 34a, 34b and vice versa. This connection could also be by any suitable means including, but not limited to, a plurality of tabs, an adhesive, tape, magnets, sonic welding, etc. The front housing 30a, 30b could be constructed of a thermally conductive and electrically insulative polymer material. Such a material could include, but is not limited to, electrically insulative and thermally conductive materials (e.g., plastic).

The cover 32a, 32b could be formed using a suitable manufacturing process (e.g., injection molding, compression molding, thermoforming, etc.). The cover 32a, 32b could be formed from any suitable, electrically-insulating material, such as glass or a polymeric material (e.g., plastic). Such a material could include, but is not limited to, amorphous transparent copolymer having a cyclic olefin copolymer copolymerized from norbornene and ethylene using a metallocene catalyst and possessing properties important in optical components such as lenses. Such material possesses properties including, but not limited to, high transparency, low birefringence, high flowability for precision molding, high heat resistance and negligible water absorption.

Advantageously, the electrically non-conductive nature of the exterior components of the emitter and receiver devices 14a, 14b of the system 10 (i.e., the front housing 30a, 30b, the cover 32a, 32b, and the rear housing 34a, 34b) permit the emitter and receiver devices 14a, 14b to be installed in any location in a pool or spa. Further, since the exterior of the emitter and receiver devices 14a, 14b are electrically non-conductive, no specific bonding or grounding of the emitter and receiver devices 14a, 14b is necessary.

The emitting portion 36 can emit a light beam 16 and the receiving portion 38 can receive an emitted light beam 16 to form a grid 18 across the pool 12. The emitting portion 36 and the receiving portion 38 could be encapsulated in an optically transparent potting compound (not shown). The potting compound protects the emitting portion 36 and the receiving portion 38 from exposure to water in the event that the emitter and receiver devices 14a, 14b are no longer watertight, thereby protecting against electrical shock and promoting safety. The rear housing 34a, 34b could comprise the electronics (not shown) of the emitting portion 36 and the receiving portion 38. It is noted that the emitter and receiver devices 14a, 14b could be positioned on one of a pool wall, pool coping and pool decking along the interior perimeter of the pool 12.

Figure 3:
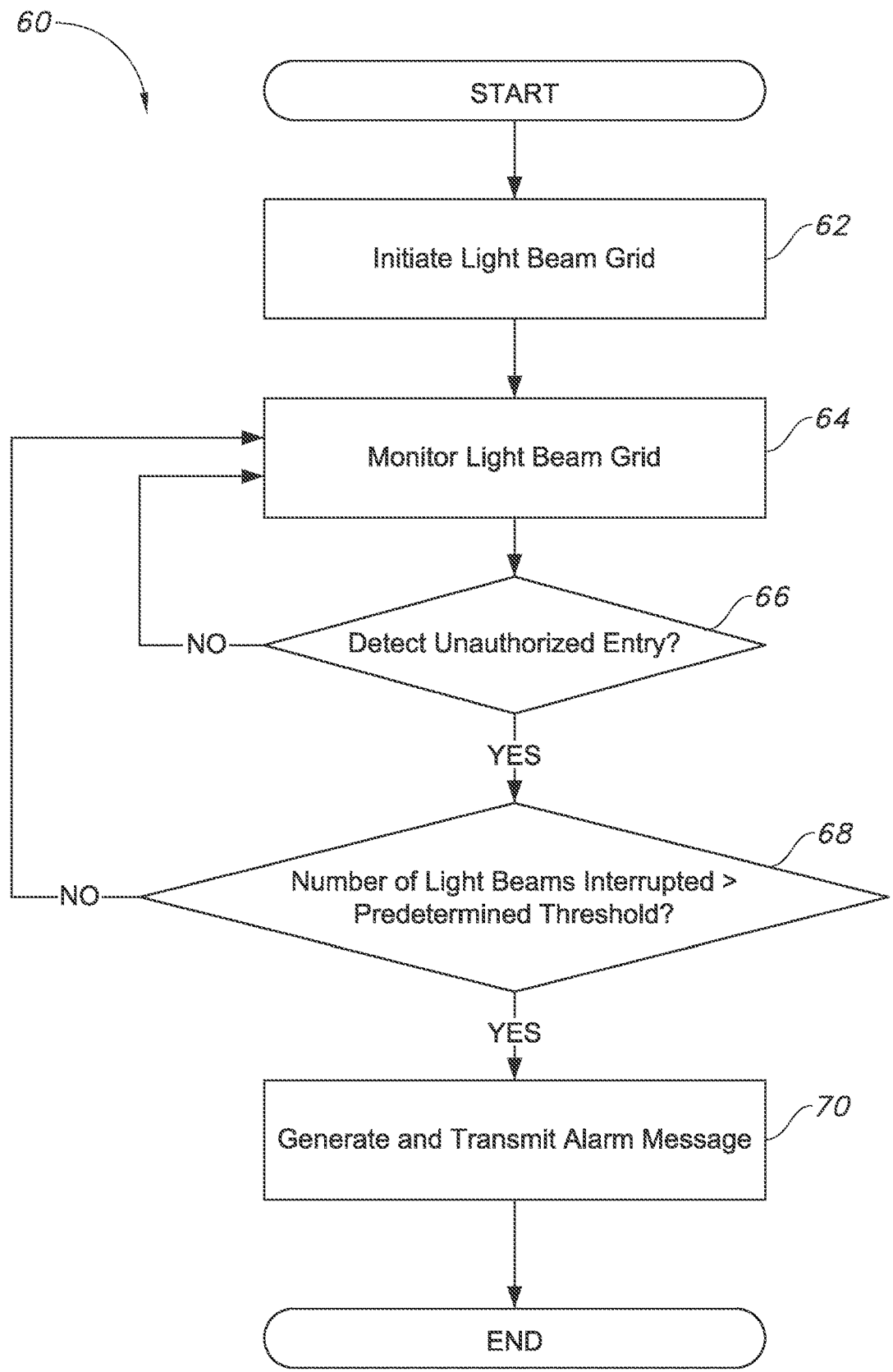
FIG. 3 is a flowchart illustrating processing steps carried out by the system.

FIG. 3 is a flowchart illustrating processing steps 60 carried out by the system 10 of FIG. 1. The system 10 provides for automatically detecting unauthorized entry into the pool 12 requiring no user involvement, and having a high degree of accuracy. Additionally, the system 10 can, upon determining the detected unauthorized entry into the pool 12, automatically generate and transmit an alarm message to a remote device and/or a home alarm system.

Beginning in step 62, the system 10 initiates the grid 18 by controlling the emitter and receiver devices 14a, 14b to emit and receive a plurality of light beams 16. Then, in step 64, the system 10 monitors the grid 18. In step 66, the system 10 determines whether unauthorized entry into the pool 12 has been detected. The system 10 automatically detects unauthorized entry into the pool 12 when the system 10 detects an interruption of the grid 18 (e.g., an interruption of at least one of the plurality of light beams 16 forming the grid 18). If the system 10 determines that unauthorized entry into the pool 12 has not been detected, then the system 10 returns to step 64 and monitors the grid 18. However, if the system 10 determines that unauthorized entry into the pool 12 has been detected, then the system 10 proceeds to step 68.

In step 68, the system 10 determines whether the detected interruption of the grid 18 exceeds a predetermined threshold. Specifically, the system 10 determines whether a number of interrupted light beams 16 (i.e., light beams 16 that are not received by their corresponding receiver devices 14) exceeds a predetermined threshold of interrupted light beams 16. If the system 10, determines that the number of interrupted light beams 16 does not exceed the predetermined threshold of interrupted light beams 16, then the system returns to step 64 and monitors the grid 18. However, if the system 10 determines that the number of interrupted light beams 16 exceeds the predetermined threshold of interrupted light beams 16, then the system 10 proceeds to step 70.

In step 70, the system 10 generates and transmits an alarm message to a remote device of a user (e.g., a pool owner)

and/or to a home alarm system. The alarm message can notify the user of a potential drowning incident in the pool 12. Accordingly, the system 10 can automatically detect unauthorized entry into the pool 12 requiring no user involvement, and having a high degree of accuracy.

Figure 4:
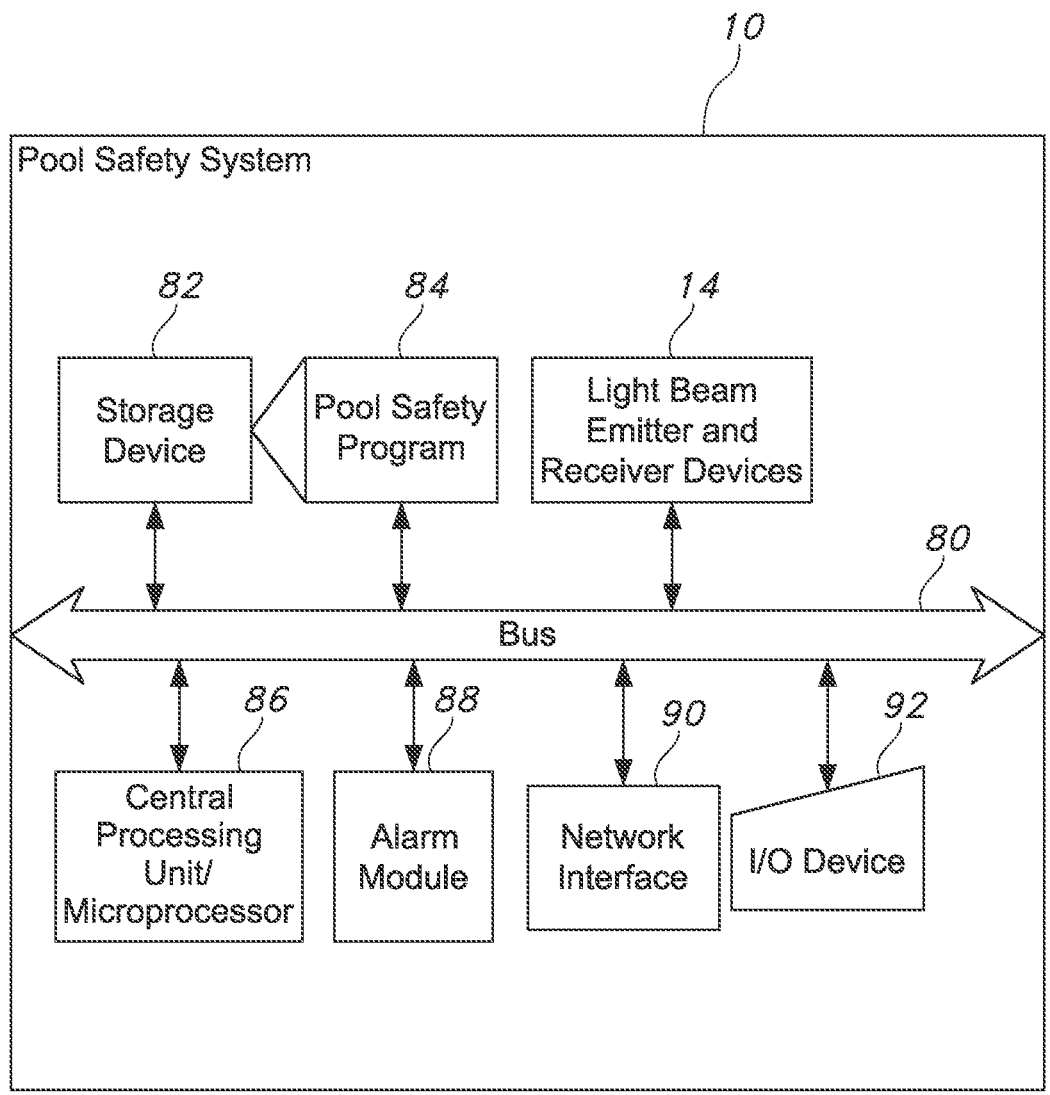
FIG. 4 is a diagram illustrating hardware and software components capable of being utilized to implement the system.

FIG. 4 is a diagram illustrating hardware and software components capable of being utilized to implement the system 10. The system 10 can include a communications bus 80, a storage device 82, pool safety code 84, a plurality of emitter and receiver devices 14a, 14b, a central processing unit (CPU) 86, an alarm module 88, a network interface 90 and one or more input devices 92 including, but not limited to, a keyboard, a mouse, etc.

The storage device 82 could comprise any suitable, computer-readable storage medium such as disk, non-volatile memory (e.g., read-only memory (ROM), erasable programmable ROM (EPROM), electrically-erasable programmable ROM (EEPROM), flash memory, field-programmable gate array (FPGA), etc.).

The functionality provided by the system 10 of the present disclosure could be provided by the pool safety program 84, which could be embodied as computer-readable program code stored on the storage device 82 and executed by the CPU 86 using any suitable, high or low level computing language, such as Python, Java, C, C++, C#, .NET, MATLAB, etc. Accordingly, execution of the pool safety program 84 is configured to control operation of the plurality of emitter and receiver devices 14a, 14b and the alarm module 88. The alarm module 88 generates and an alarm message that can be transmitted to one or more of a remote device of the user, a home alarm system and a monitoring station.

The network interface 90 could include an Ethernet network interface device, a wireless network interface device, or any other suitable device which permits the system 10 to communicate via a network to a remote device of the user including, but not limited to, a personal computer, a server, a smart phone, tablet computer etc. The CPU 86 could include any suitable single-core or multiple-core microprocessor of any suitable architecture that is capable of implementing and running the pool safety program 84 (e.g., Intel processor).

A further embodiment of the present invention is shown in FIGS. 5-10.

According to an embodiment of the present invention, referring to FIGS. 5-9, there is shown a swimming pool safety system 110 ("safety system") configured to easily and conveniently installed on an existing swimming pool 112 and provides an automatic detection of unauthorized entry into the swimming pool 112 with a high degree of accuracy and without any user involvement. The safety system 110 includes a plurality of first overlay structures 114, a plurality of second overlay structures 116, and a control system 18 capable of communicating with the first and second overlay structures 114, 116. The plurality of first overlay structures 114 and the plurality of second overlay structures 116 are designed and configured to be installed on top of a swimming pool coping 120, as will be described in greater detail below.

Referring again to FIGS. 5-9, each of the plurality of first overlay structures 114 includes a first body member 122 and a plurality of light beam emitter devices 124 mounted on the first body member 122. In the depicted embodiment, each of the plurality of first overlay structures 114 has a top wall 126 and a front wall 128 transitioning into the top wall 126. The top wall 126 and front wall 128 extend between a first end and a second end of the first overlay structure 114. In the depicted embodiment, the front wall 128 is arcuate. However, the top and front walls 126, 128 of the overlay structure 114 may be constructed in any suitable shape to overlay the swimming pool coping 120.

A plurality of apertures 130 are defined on the front wall 128 with an evenly spaced distance therebetween. Each of the plurality of light beam emitter devices 124 is mounted on the first overlay structure 114 via its corresponding aperture 130. In depicted embodiment, each of the plurality of light beam emitter devices 124 is mounted such that the emitter device 124 is disposed on an inner surface of the front wall 128 of the first overlay structure 114. Alternately, the plurality of light beam emitter devices 124 may be mounted on an outer surface of the front wall 28 of the first overlay structure 114.

Figure 7:
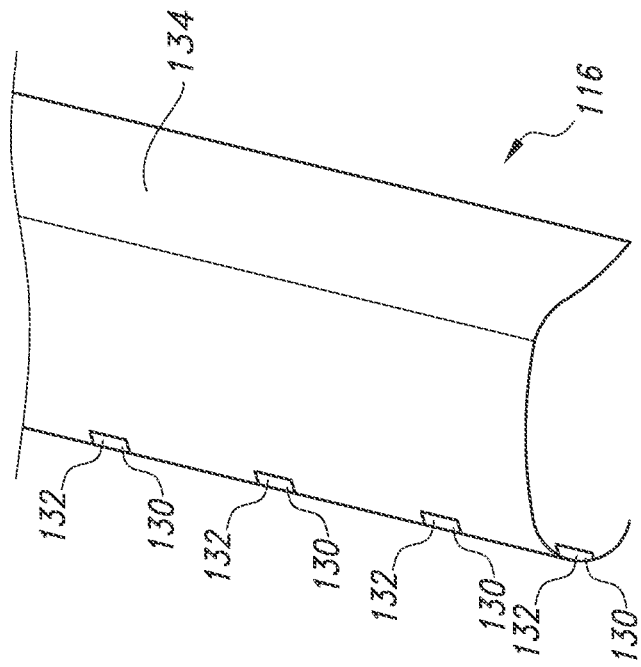
FIG. 7 is a perspective view of the second overlay structure of the swimming pool safety system in FIG. 1.

As shown in FIG. 7, the plurality of second overlay structures 116 are substantially identically to the plurality of first overlay structures 114 except that a plurality of light beam receiver devices 132 are mounted on a second body member 134 of the second overlay structure 116 via its corresponding aperture 130.

Figure 5:
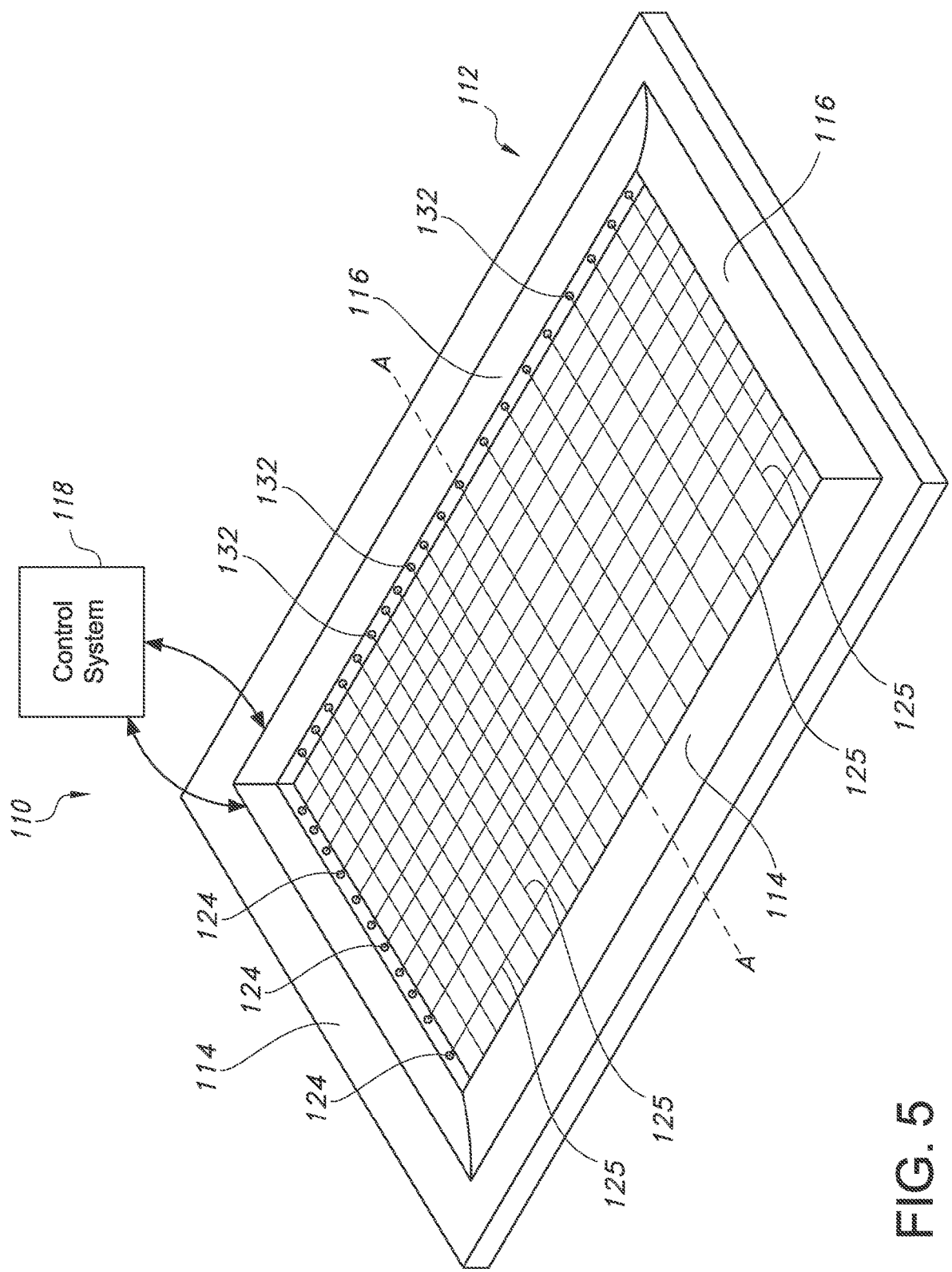
FIG. 5 is a perspective view of a swimming pool safety system installed on top of the swimming pool coping of a swimming pool, according to an embodiment of the present invention.
Figure 6:
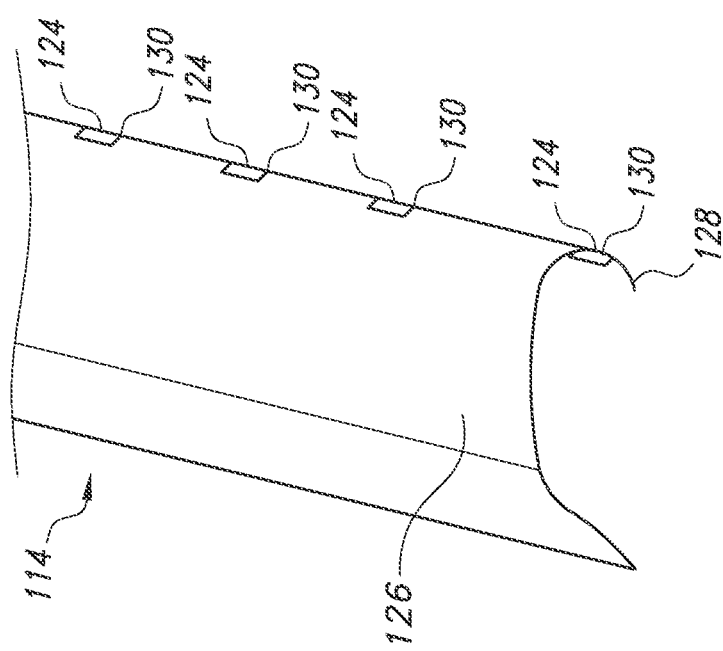
FIG. 6 is a perspective view of the first overlay structure of the swimming pool safety system in FIG. 1.

Referring particularly to FIGS. 5, 6 and 7, the plurality of first overlay structures 114 are overlaid and installed on top of the swimming pool coping 120 with the plurality of second overlay structures 116 being overlaid and installed on top of the swimming pool coping 120 opposite the plurality of first overlay structures 114 such that each of the first overlay structure 114 faces its corresponding second overlay structure 116. The design and configuration of the first and second overlay structures 114, 116 allow easy and convenient installation of the emitter and receiver devices 124, 132 on the existing swimming pool 112 since the devices 124, 132 do not need to be installed on the side walls of the swimming pool 112.

The plurality of first overlay structures 114 and the plurality of second overlay structures 116 may be attached to the swimming pool coping 120 using any known attachment mechanisms. Non-limiting examples of the attachment mechanism includes adhesive, screws, Velcro, and magnets. In a preferred embodiment shown in FIG. 5, the first overlay structures 114 are positioned along one enclosed side of the swimming pool coping 120, and the second overlay structures 116 are positioned along the opposite enclosed side of the swimming pooling coping 120.

Referring again to FIG. 8, in the depicted embodiment, the plurality of first overlay structures 114 and the plurality of second overlay structures 116 are designed and constructed such that, when they are overlaid and installed on top of the swimming pool coping 120, spaces are created between each of the first and second overlay structures 114, 116 and the swimming pool coping 120. Specifically, a first space 136 is created between the front wall 128 of the overlay structure 114, 116 and a front portion of the swimming pool coping 120. Additionally, a second space 138 is formed between the top wall 126 of the overlay structure 114, 116 and a top portion of the swimming pool coping 120. The spaces 136, 138 allow the light beam emitter devices 124, light beam receiver devices 132, and wires (not shown) to be disposed therewithin.

Alternately, the plurality of first overlay structures 114 and the plurality of second overlay structure 116 are designed and constructed such that the top wall 126 of the overlay structure 14, 16 is flushed with (or attached directly to) the top portion of the swimming pool coping 120, thereby creating only the first space 136 between the front wall 128 of the overlay structure 114, 116 and the front portion of the swimming pool coping 120, as shown in FIG. 9.

The first overlay structures 114, second overlay structures 116, emitter devices 124, and receiver devices 132 are made of one or more materials having suitable properties for a desired application, including strength, weight, rigidity, etc. Thermally conductive and electrically insulative polymer materials (e.g., plastic) are preferred. Since the emitter and receiver devices 124, 132 are electrically non-conductive, no specific bonding or grounding of the emitter and receiver devices 124, 132 is necessary.

Referring back to FIG. 5, each of the plurality of light beam emitter devices 124 emits a light beam 125 such as an infrared light beam, and each of the corresponding light beam receiver 132 devices receives the light beam 125 from its corresponding light beam emitter device 124 to form a grid of the light beams 125, extending across the swimming pool 112 above a swimming pool waterline. Any suitable light beam or any type of point-to-point connection that can be interrupted by an object passing between the points (e.g., a laser) may be used to form the grid over the swimming pool 112.

The emitter and receiver devices 124, 132 may include wire (not shown) for supplying power to the emitter and receiver devices 124, 132. The emitter and receiver devices 124, 132 may be constructed in any shape form including, but not limited to, a rectangle, a square, a circle, etc.

Figure 10:
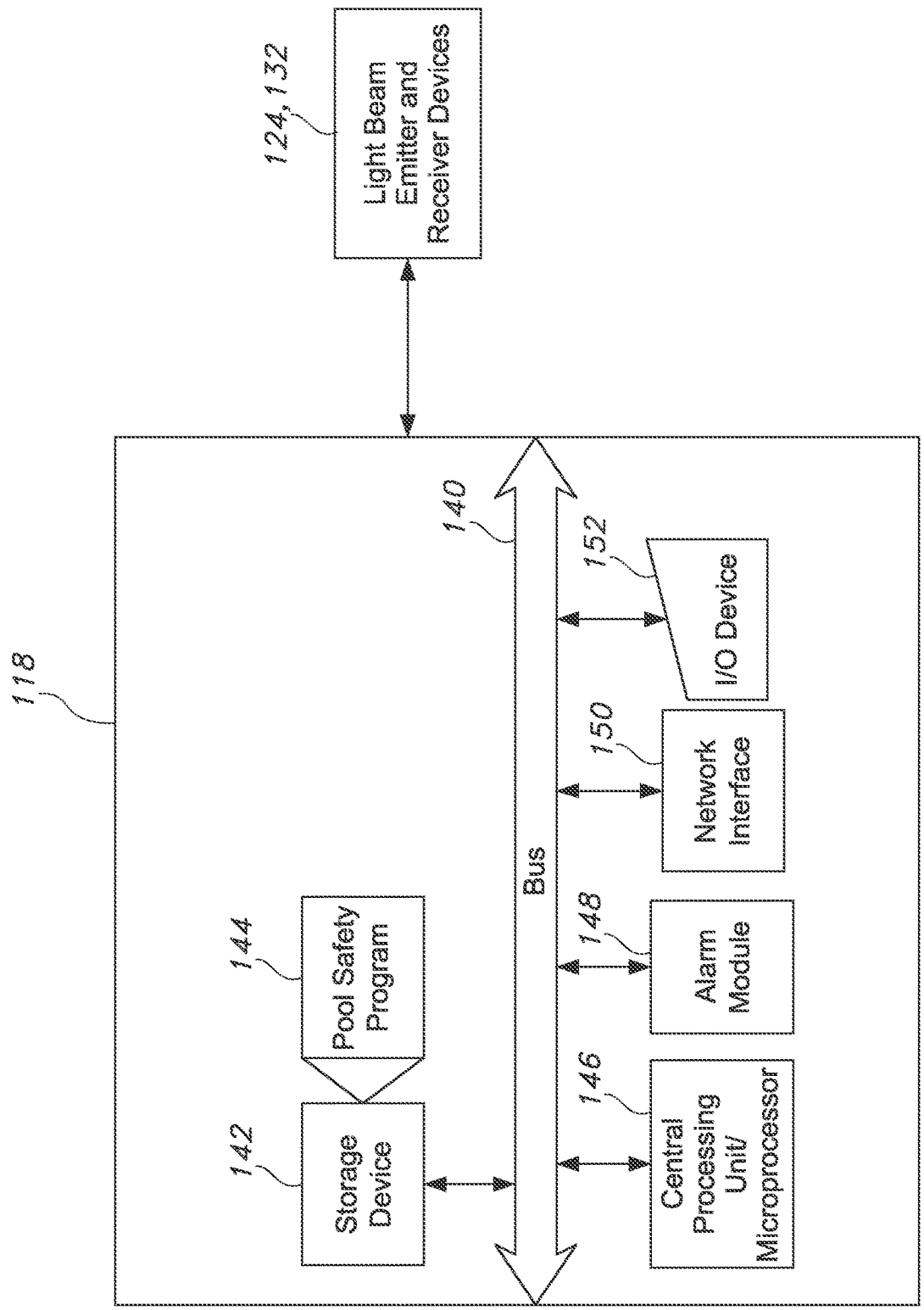
FIG. 10 is a diagram illustrating components of the control system capable of communicating with the first and second overlay structures in FIG. 1.

FIG. 10 is a diagram illustrating the control system 118 of the safety system 110 capable of communicating with the plurality of emitter devices 124 and plurality of receiver devices 132. The control system 118 may include a communications bus 140, a storage device 142, pool safety program 144, a central processing unit (CPU) 146, an alert module 148, a network interface 150, and one or more input devices 152 including, but not limited to, a keyboard, a mouse, etc.

The storage device 142 may comprise any suitable, computer-readable storage medium such as disk, non-volatile memory (e.g., read-only memory (ROM), erasable programmable ROM (EPROM), electrically-erasable programmable ROM (EEPROM), flash memory, field-programmable gate array (FPGA), etc.).

The functionality provided by the control system 118 of the present disclosure is provided by the pool safety program 144, which may be embodied as computer-readable program code stored on the storage device 142 and executed by the CPU 146 using any suitable, high or low level computing language, such as Python, Java, C, C++, C#, .NET, MATLAB, etc. Accordingly, execution of the pool safety program 144 is configured to control operation of the plurality of emitter and receiver devices 124, 132 and the alert module 148. The alert module 148 generates and an alert that can be transmitted to one or more of a remote computing device of the user, a home alarm system, and a monitoring station. The alert may be a displayed message and/or an audible alert that notify the user of a potential drowning incident in the swimming pool 112.

The network interface 150 may include an Ethernet network interface device, a wireless network interface device, or any other suitable device that permits the control system 118 to communicate via a network to a remote computing device of the user. The CPU 146 may include any suitable single-core or multiple-core microprocessor of any suitable architecture that is capable of implementing and running the pool safety program 144 (e.g., Intel processor).

As stated above, the control system 118 is configured to communicate with the plurality of first overlay structures 114 and the plurality of second overlay structures 116. Specifically, the control system 118 communicates with the plurality of light beam emitter devices 124 and the plurality if light beam receiver devices 132 to detect unauthorized entry into the swimming pool 112. The control system 118 controls the plurality of light beam emitter devices 124 to emit a plurality of light beams 125 and the plurality of light beam receiver devices 132 to receive the plurality of emitted light beams 125 to form a grid extending across the swimming pool 112. The control system 118 monitors the grid and detects the unauthorized entry into the swimming pool 112 based on an interruption of the light beams 125 of the grid. If the control system 118 determines that the number of interrupted light beams exceeds a predetermined threshold of interrupted light beams, then the control system 118 generates and transmits an alert to a remote computing device of a user (e.g., a swimming pool owner) and/or a home alarm system. The alert can notify the user of a serious incident (e.g., drowning incident) in the swimming pool. Non-limiting examples of remote computing devices include a personal computer (laptop or desktop), mobile phone (smartphones), tablets, personal digital assistants (PDA), or other similar devices. The remote computing devices will typically access the control system 118 directly through an Internet service provider (ISP) or indirectly through another network interface.

The predetermined threshold may be set and/or adjusted by the user. The predetermined threshold is the number of interrupted light beams of the grid. The interruption of one light beam would provide for a very sensitive system and may result in unwanted false alerts. For example, the false alerts may be generated from movements from high winds, splashing water, small animals, insects, debris, etc. A threshold requiring interruption of two or more beams significantly reduce the false alerts. The sensitivity of the system depends on the spacing between the light beams 125 of the grid.

In use of the safety system 110, first, the plurality of first overlay structures 114 are installed on top of the swimming pool coping 120. Then, the plurality of second overlay structures 116 are installed on top of the swimming pool coping 120 opposite the plurality of first overlay structures 114 such that each of the first overlay structures 114 faces its corresponding second overlay structure 116.

The control system 118 initiates the grid by controlling the emitter and receiver devices 124, 132 to emit and receive a plurality of light beams 125. Then, the control system 118 monitors the grid. The control system 118 determines whether unauthorized entry into the swimming pool 112 has been detected. The control system 118 automatically detects unauthorized entry into the swimming pool 112 when the control system 118 detects an interruption of the grid (e.g., an interruption of at least one of the plurality of light beams 125 forming the grid).

If the control system 118 determines that unauthorized entry into the swimming pool 112 has not been detected, then the control system 118 continues to monitor the grid 118. However, if the control system 118 determines that unauthorized entry into the swimming pool 112 has been detected, then the control system 118 proceeds to determine whether the detected interruption of the grid exceeds a predetermined threshold. Specifically, the control system 118 determines whether a number of interrupted light beams (i.e., light beams that are not received by their corresponding receiver devices 132) exceeds a predetermined threshold of interrupted light beams.

If the control system 118, determines that the number of interrupted light beams does not exceed the predetermined threshold of interrupted light beams, then the control system 118 continues to monitor the grid. However, if the control system 118 determines that the number of interrupted light beams exceeds the predetermined threshold of interrupted light beams, then the control system 118 proceeds to generate an alert.

From the foregoing, it will be appreciated that a swimming pool safety system according to the present invention can be easily and conveniently installed on an existing swimming pool and provides an automatic detection of unauthorized entry into the swimming pool with a high degree of accuracy and without any user involvement.

Further embodiments and features of the present invention may now be described.

Referring to FIGS. 11-13, this embodiment places the above described emitter module (emitter) 210 and receiver module (receiver) 212 constituting a beam 214 as described above under the water 216.

The emitter 210 would consist of a down firing visible laser diode with focusable collimating lens 218 with a fold mirror 220 to point the beam 214 parallel to the water in a watertight housing 222 with a watertight window 224 which the beam 214 will pass through. The emitter module 210 would be placed over the vinyl liner 219. This design minimizes the distance the module protrudes laterally into the pool, for both aesthetic and damage mitigation reasons and keeps the wiring and electronics 226 above the water line.

Referring also to FIG. 13, the receiver module 212 will be housed in a similar looking watertight housing 230 placed over the vinyl liner 219 with a watertight window 231, which will transmit the beam 214, behind which will sit a collection lens and photodiode receiver 232 to convert the beam 214 sent by the emitter module 210 having traversed the pool unbroken into an electrical signal to be processed by the wiring and electronics 266 which are housed above the waterline.

The emitter and receiver modules 210, 212 can be attached to the coping 240 through a variety of means. The depth of the beam would be roughly 6 inches below the nominal surface of the water. Low enough to avoid false alarms due to waves caused by wind, the displacement of unoccupied floating accessories, or animals drinking, but high enough to capture unauthorized entry into the pool.

As mentioned above, it is expected that any above water versions of this system would require multiple beams along any given side of the pool to ensure multiple beam breaks during unauthorized entry to protect against false alarms. Given its resistance to false alarms inherent in similar above water systems, it maybe be possible and preferable to reduce the number of beams along any side of the pool, possibly only requiring a single beam along any side of rectangular pools. This would be a cost savings in both materials and installation time. This embodiment requires an understanding of the electromagnetic spectrum and its transmission through water, it is important to understand the preferred wavelength of light for transmission under the water is in the visible portion of the spectrum (see Optical Absorption of Water Compendium https://omlc.org/spectra/water/abs/index.html).

The light array can be situated to make the level of detection greater or less through spacing of the light array. User can choose one light beam (least secure from false alarms) or use multiple linked beams for enhanced control of false alarms. By adding beams of light the user can choose any multiple of emitting linked beams to be broken simultaneously which would lessen false alarms. For example, three beams at 6" apart would create an alarm only when all three lines are broken or something larger than 1 ft in length or diameter would cross those three lines. Obviously one could choose to add more light beams and more break points or less light beams with less break points. It is also understood that using less line breaks and simply spreading the emitting beams farther apart would achieve similar results. Depending on pool usage, elderly assisted living home you could use less beams since the users are all adults and a larger spread of those beams would be safe for full grown adults. Of course, that would reduce the detection smaller object or a child but having the light array wider would significantly reduce false alarms.

Figure 13A:
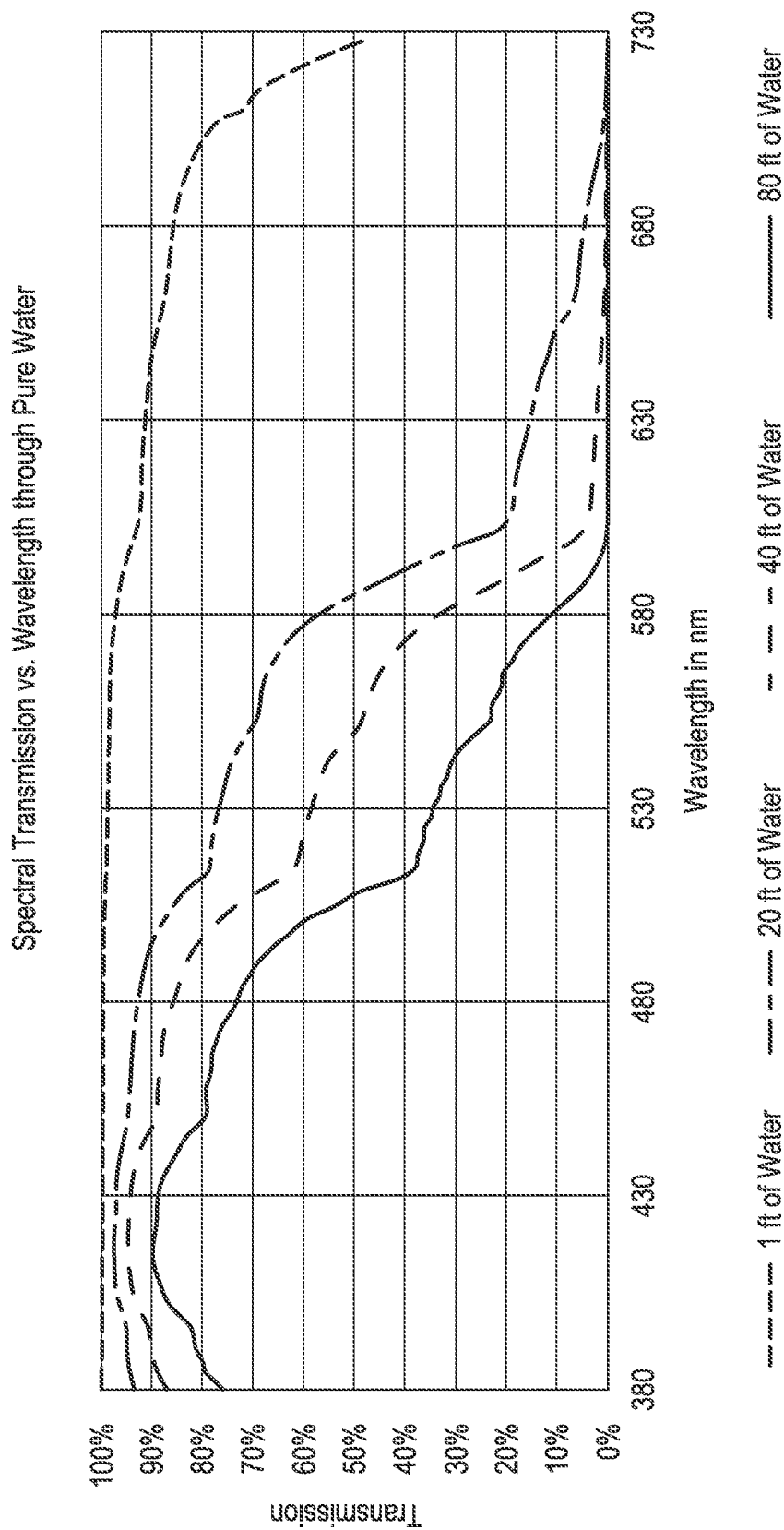
FIG. 13A is a graph showing calculation of light transmission through water.

FIG. 13A shows our calculations based on the formulas provide in the reference above regarding the percent transmission per foot through liquid water and the transmission through 20, 40, and 80 feet representing various length pools. This shows using emitters with wavelengths that fall in the 400 to 560 nm range or Blue to Green. There are a number of mass produced Lasers and LEDs that fall within this range. Further benefits include ease of alignment between the emitter and receiver as the installer is able to see the beam without the use of special tools as is required in the InfraRed. Lastly, some percentage of the energy lost due scattering small bubbles and particles in the water will provide a pleasing blue or green illumination, also indicating the presence of an alarm system to would be intruders.

Referring to FIG. 14, another embodiment of the present invention places the above mentioned emitter and receiver modules 210, 212 in vertically holes drilled holes 250 into the surrounding concrete fill 252 to a depth of roughly six inches below the water line and a second horizontally drilled hole 251 that meets the mating vertically drilled hole 250 for a cross drilled hole pattern. The horizontally drilled holes 251 will be below the nominal water line and will penetrate through the vinyl or other surface of the pool 219 and will have a watertight sealing window 257 which will transmit the beam to the receiver having a matching set of drilled holes and window. The horizontal hole 251 may include a support tube (not shown) to reinforce the surrounding dirt or concrete to prevent settling from closing the horizontal hole. This embodiment has the benefit of being a more discrete and robust installation.

In still another embodiment shown in FIGS. 15 and 16, a single module 260 which places the visible laser diode with focusable collimating lens 218 and fold mirror 220 adjacent to the photodiode receiver with collection lens 221 in the same watertight housing 262 behind a shared water tight window 264 being controlled by common wiring and electronics 266. The beam 214 generated by the emitter will traverse the pool and be reflected by a retro reflective material 280 which will ensure the beam returns to the location it was sent from regardless of small angular misalignments of reflector, i.e., the reflector is not normal (perpendicular) to the beam.

The retro reflective material 280 is readily available and generally used to increase the contrast of an object in dark conditions for safety reasons, for example the perimeter of road signs or strips on construction apparel. Retro reflective material 280 has the unique ability to send light back where it came from as opposed to a mirror which redirects light based on the angle at which the light strikes it. The inclusion of this optical technique in this manner enables the improvements described.

This embodiment has the advantage of cutting the number of required modules for any number beams in half thus reducing material cost. It also greatly simplifies the installation by only requiring wiring and module installation on two sides of the pool, and the far simpler Retro Reflector installation on the other two sides.

This embodiment could be implemented in both above and below water versions of the alarm system in the visible or infrared spectrum. Any version of this embodiment could be installed mounted to the coping as shown in FIG. 11 or into cross drilled holes as demonstrated in FIG. 14.

An additional embodiment includes components from any of the above-mentioned embodiments with the addition of a narrow waveband (narrowband) filter to limit the receiver sensitivity to only the waveband in the beam produced by the emitter. Use of narrowband filter will improve the rejection of momentary changes in ambient light conditions preventing false alarms.

Examples of changing ambient light conditions include lights from cars driving by and the sun coming in and out of clouds. Further improvements to ambient light rejection can be gained by encoding the beam as modulated signal. This would consist of pulsing the beam on and off at a rapid rate such that the time between the beams in insignificant with respect to falling object detection. This pulsing could be a constant pattern such as a sinusoid or square wave pattern, or could be a more complex signal which could be programmed to indicate which emitter it came from, this unique pattern would be the emitters signature.

Placing the grid of beams below the surface of the water assists in reducing false alarms. The depth below the surface being as low as possible to avoid uncovering by small waves, drinking by animals etc., while being high enough to guarantee detection of a buoyant.

Other features of the present invention are set forth as follows.

The emitters producing the beams may be of a visible wavelength given their superior transmission through water.

The receiver may include a photodiode with a narrow bandpass filter matching the wavelength of the emitter.

The beams may be modulated at a high frequency to create an AC signal or alternatively a more complex pulsed signature at the photodiode as means of rejecting changes in ambient light triggering false alarms.

It is contemplated that only single beams along the perimeter may be needed.

The emitter and receiver for a given beam may be placed adjacent to each other in the same module or submodule, where the beam is reflected from the other side of the pool using highly efficient retro reflective material or similar means back to the adjacent receiver. Such a configuration would decrease manufacturing costs by packaging the emitters and receivers together with a shared housing and electronics. Installation would be simplified as there are fewer modules to physically locate and run power and communications to.

The emitter and receivers may be placed in cross drilled holes in the cement (or similar) fill surrounding the pool to improve aesthetics and robustness.

While the preferred embodiment of the present invention has been described with respect to inground pools it is contemplated that the present invention may also be used with respect to above ground pools.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected is set forth in the following claims.

What is claimed is:

1. A system for automatically detecting unauthorized entry into a pool, comprising:
   a plurality of light beam emitter devices positioned about the pool;
   a plurality of light beam receiver devices positioned about the pool, each of the plurality of light beam receiver devices each corresponding to a light beam emitter device; and
   a processor in communication with the plurality of light beam emitter devices and the plurality of light beam receiver devices, the processor:
      controlling the plurality of light beam emitter devices to emit a plurality of light beams and controlling the plurality of light beam receiver devices to receive a plurality of emitted light beams to form a grid of variable sizes and widths extending across a surface of the pool, each of the plurality of light beam receiver device receiving a light beam from corresponding light beam emitter device;
      monitoring the grid;
      detecting unauthorized entry into the pool based on an interruption of the grid;
      determining whether a level of the interruption of the grid exceeds a predetermined threshold; and
      if the level of the interruption of the grid exceeds the predetermined threshold, generating and transmitting an alarm message to a remote device of a user;
   wherein the plurality of light beam emitter devices and receiver devices are mounted below the surface of the water.

2. A system of claim 1, wherein the emitters producing the beams are of a visible wavelength.

3. A system of claim 1, wherein the receiver is a photodiode with a narrow bandpass filter matching the wavelength of the of the emitter.

4. A system of claim 1, wherein the beams are modulated at a high frequency.

5. A system of claim 1, wherein the grid of variable sizes includes only single beams along the perimeter.

6. A system of claim 1, wherein the emitter and receiver for a given beam are adjacent to each other in the same module, and further including a reflector mounted opposite the same module for reflecting the beam from to the emitter device to the receiver device.

7. A system of claim 6, wherein the reflector is a retro reflector.

8. A system of claim 1, wherein the emitter and receivers are placed in cross drilled holes, a horizontal hole below the water line and a vertical hole to intersect the horizontal hole.

* * * * *